United States Patent
Delker et al.

(10) Patent No.: US 7,315,738 B1
(45) Date of Patent: Jan. 1, 2008

(54) METHOD AND SYSTEM FOR MANAGING MULTIPLE DIRECTORY NUMBERS FOR A MOBILE STATION

(75) Inventors: Jason R. Delker, Olathe, KS (US); John M. Everson, Kansas City, MO (US); Bryce A. Jones, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 477 days.

(21) Appl. No.: 10/659,822

(22) Filed: Sep. 11, 2003

(51) Int. Cl.
*H04M 3/42* (2006.01)

(52) U.S. Cl. .................. 455/414.1; 455/415; 379/142

(58) Field of Classification Search ............. 455/458, 455/417, 564, 419, 415, 567, 422, 414.1; 379/201.01, 142.06, 265.02, 142
See application file for complete search history.

(56) References Cited

U.S. PATENT DOCUMENTS

| | | | |
|---|---|---|---|
| 5,220,599 A * | 6/1993 | Sasano et al. ......... 379/142.06 |
| 5,371,781 A | 12/1994 | Ardon | |
| 5,448,622 A | 9/1995 | Huttunen | |
| 5,530,736 A | 6/1996 | Comer et al. | |
| 5,602,904 A * | 2/1997 | Hanai et al. .......... 379/265.02 |
| 5,673,313 A | 9/1997 | Kato | |
| 5,764,730 A | 6/1998 | Rabe et al. | |
| 5,835,863 A * | 11/1998 | Ikenouchi et al. .......... 455/567 |
| 5,848,362 A * | 12/1998 | Yamashita ................ 455/567 |
| 5,884,200 A | 3/1999 | Yamane et al. | |
| 5,983,095 A * | 11/1999 | Cameron ................... 455/417 |
| 6,094,587 A * | 7/2000 | Armanto et al. ........... 455/567 |
| 6,216,017 B1 * | 4/2001 | Lee et al. .................. 455/567 |
| 6,311,063 B1 | 10/2001 | Valliani et al. | |
| 6,539,223 B1 | 3/2003 | Bijanki et al. | |
| 6,574,489 B1 * | 6/2003 | Uriya ......................... 455/567 |
| 6,618,587 B1 * | 9/2003 | Ghafoor .................... 455/419 |
| 6,745,040 B2 * | 6/2004 | Zimmerman ............... 455/458 |
| 6,785,560 B1 * | 8/2004 | Chow et al. ............... 455/564 |
| 6,870,915 B2 * | 3/2005 | Stillman et al. ....... 379/201.01 |
| 2002/0094806 A1* | 7/2002 | Kamimura ................. 455/415 |
| 2002/0198007 A1* | 12/2002 | Zimmerman .............. 455/458 |

* cited by examiner

*Primary Examiner*—Joseph Feild
*Assistant Examiner*—Michael T. Vu

(57) ABSTRACT

A mobile station is identified by a plurality of directory numbers. One or more of the directory numbers are associated with distinct identifier codes that identify a directory number or "personality" in transmissions over the air interface, e.g., for call origination from the mobile station and/or call termination to the mobile station. When the mobile station receives an identifier code when it receives a call, the mobile station provides a distinct user-discernible indication that is specific for that identifier code. From this distinct user-discernible indication, the use may determine which directory number is being called. When originating a call, the mobile station may transmit an identifier code to indicate which directory number to use as the calling party number.

8 Claims, 4 Drawing Sheets

METHOD AND SYSTEM FOR MANAGING MULTIPLE DIRECTORY NUMBERS FOR A MOBILE STATION

BACKGROUND

1. Field of the Invention

The present invention relates to telecommunications and, more particularly, to methods and systems for managing multiple directory numbers for a mobile station.

2. Description of Related Art

With the continued increase in the availability of wireless telecommunications, has come an increased ability to reach people on their mobile stations wherever they may be located. The capability of receiving telephone calls in nearly any location provides many advantages, but it can also create problems. For example, a user may be interrupted by a call to his or her mobile station during an important meeting. Alternative forms of call alerting, such as vibrating instead of ringing, can minimize the interruption problem. However, some users may want to be interrupted for certain important calls. More generally, many users tend to "screen" calls to their mobile stations to determine whether the call is important enough to answer immediately or whether to let the call go to voice mail instead. Users often engage in such call screening based on the calling party information their mobile stations display when alerted. However, call screening based on calling party information has certain drawbacks. For example, some incoming calls may not generate calling party information, or the calling party may be calling from a payphone or other unrecognized telephone number. Moreover, the process of reading calling party information on a mobile station display can itself be a significant interruption.

Accordingly, there is a need to provide ways to enable users to better manage the many types of calls they receive on their mobile stations.

SUMMARY

In a first principal aspect, an exemplary embodiment of the present invention provides a method of managing a plurality of directory numbers for a mobile station. The plurality of directory numbers includes at least a first directory number and a second directory number. In accordance with the method, the first directory number is associated with an identifier code that is recognized by the mobile station. A request to connect an incoming call to the first directory number is detected. A query that identifies the first directory number is transmitted to a call control system. A response to the query is received. The response includes the identifier code associated with the first directory number. A message is transmitted to the mobile station. The message includes the identifier code to indicate that the first directory number is called.

In a second principal aspect, an exemplary embodiment of the present invention provides a system for managing a plurality of directory numbers for a mobile station. The plurality of directory numbers includes at least a first directory number and a second directory number. The system comprises: (1) a call connection system for connecting calls to the mobile station over an air interface; and (2) a call control system for controlling the call connection system. The call control system stores an association between the first directory number and an identifier code that is recognized by the mobile station.

In a third principal aspect, an exemplary embodiment of the present invention provides a method of managing a plurality of directory numbers for a mobile station. The plurality of directory numbers includes at least a first directory number and a second directory number. In accordance with the method, the first directory number is associated with an identifier code used by the mobile station to indicate call origination from the first directory number. A request to originate a call from the mobile station to a called party is detected. The request includes the identifier code. A query that includes the identifier code is transmitted to a call control system. A response to the query is received. The response includes the first directory number. The call is routed to the called party, such that the first directory number is identified as a calling party number.

DETAILED DESCRIPTION OF EXEMPLARY EMBODIMENTS

In exemplary embodiments of the present invention, a mobile station is associated with a plurality of directory numbers that other users may dial to reach the mobile station. Each directory number may have a distinct meaning, significance, or "personality." For example, one directory number may be a work number and another directory number may be a personal number or a home number. Moreover, a mobile station may have more than one work number (e.g., different directory numbers for different business) and/or more than one personal number (e.g., one personal directory number that is given out generally and another personal directory number that is only given out to close friends and relatives). Other types of directory numbers with other "personalities" could also be used.

One or more of the mobile station's directory numbers are associated with distinct identifier codes. An identifier code identifies a directory number or "personality" in transmissions over the air interface, e.g., for call origination from the mobile station and/or call termination to the mobile station. Thus, a mobile station may have multiple directory numbers but may still have only one mobile station identification (MSID) or mobile identification number (MIN). When the mobile station receives an identifier code when it receives a call, the mobile station may provide a distinct user-discernible indication that is specific for that identifier code. Distinct user-discernible indications may involve, for example, different ring tones, lights, icons, and/or screen colors. In this way, when a user's mobile station receives an incoming call, a user may recognize what directory number or "personality" is being called from the distinct user-discernible indication and thereby determine how to respond to the call.

Identifier codes may also be used for call origination. Specifically, a user may select which directory number to use to originate a call. To identify the selected directory number, the mobile station transmits an identifier code associated with the selected directory number. The identifier codes for call origination and call termination may, but need not be, the same.

1. EXEMPLARY NETWORK ARCHITECTURE

Figure 1:
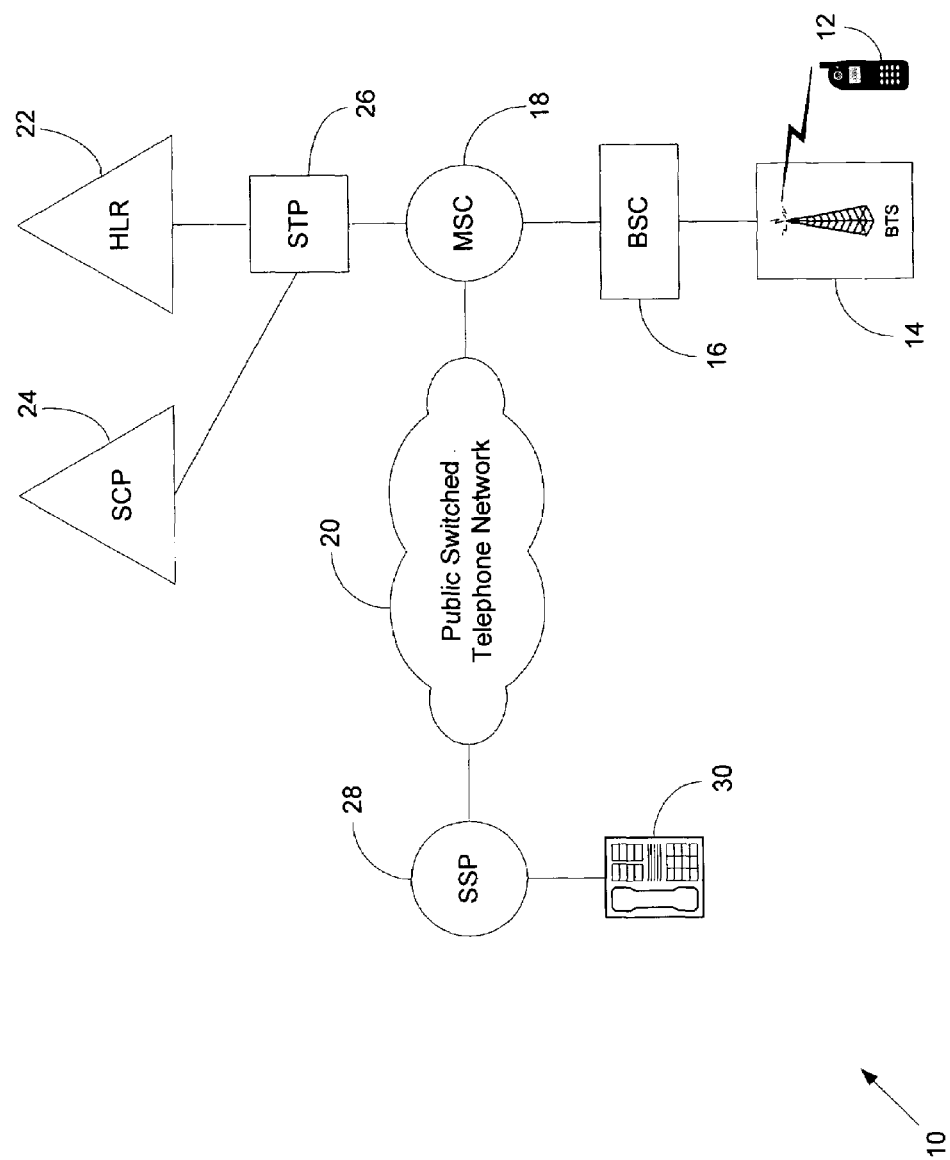
FIG. 1 is a simplified block diagram of a wireless telecommunications system, in accordance with an exemplary embodiment of the present invention.

Referring to the drawings, FIG. 1 is a simplified block diagram of an exemplary wireless telecommunications system 10 in which exemplary embodiments of the present invention may be employed. A user may use a wireless communication device, such as mobile station 12, for communicating via wireless telecommunications system 10. Mobile station 12 may be a wireless telephone, personal digital assistant (PDA), wirelessly equipped laptop computer, or other device that can communicate over an air interface. As described in more detail below, mobile station 12 is associated with a plurality of directory numbers and is responsive to one or more identifier codes associated with one or more of these directory numbers.

To provide service to wireless communication devices, such as mobile station 12, wireless telecommunications system 10 may include a base transceiver station (BTS) 14 that provides a wireless coverage area. BTS 14 may communicate over an air interface with one or more wireless communication devices, such as mobile station 12, located in this wireless coverage area. The communications between BTS 14 and mobile station 12 may occur in a digital format, such as CDMA, TDMA, GSM, or 802.11x, or they may occur in an analog format, such as AMPS. A preferred wireless communications format is "cdma2000," such as described in EIA/TIA/IS-2000 Series, Rev. A (published March 2000), which is incorporated herein by reference.

BTS 14 may be controlled by a base station controller (BSC) 16, which, in turn, may be controlled by a mobile switching center (MSC) 18. MSC 18 may be connected to the public switched telephone network (PSTN) 20. MSC 18 may be able to communicate with a home location register (HLR) 22 and with a service control point (SCP) 24, typically, via one or more signal transfer points (STPs), such as STP 26. As described in more detail below, MSC 18 may communicate with HLR 22 and/or SCP 24 in order to obtain a directory number associated with an identifier code or to obtain an identifier code associated with a directory number, e.g., for calls originating from or terminating to mobile station 12. Thus, HLR 22 and/or SCP 24 may store associations between directory numbers and identifiers for mobile stations, such as mobile station 12.

Although FIG. 1 shows MSC 18 connected to one BSC and shows BSC 16 connected to one BTS, in general, MSC 18 may be connected to more than one BSC and each BSC, such as BSC 16, may be connected to more than one BTS. In addition, although FIG. 1 shows MSC 18 connected to PSTN 20, MSC 18 and/or BSC 16 may be connected to other networks instead of or in addition to PSTN 20. For example, MSC 18 may be connected to a packet-switched network via an interworking function (IWF), or BSC 16 may be connected to a packet-switched network via a packet data serving node (PDSN) or may be trunked.

In addition to MSC 18, PSTN 20 may be connected to other call connection systems, including other MSCs and service switching points (SSPs), such as SSP 28. SSP 28 may, in turn, be connected to one or more landline telephony devices, such as landline telephone 30. MSC 18, SSP 28, and other call connection systems connected to PSTN 20 may use an out-of-band signaling system, such as SS7, to route calls through PSTN 20. In this way, MSC 18 may be able to connect incoming calls from PSTN 20, which calls may originate from landline telephones, mobile stations, or other communication devices, to wireless communication devices, such as mobile station 12, that are operating in its service area. Similarly, MSC 18 may be able to connect calls originating from wireless communication devices, such as mobile station 12, through PSTN 20.

As noted above, MSC 18 may engage in signaling with call control systems, such as HLR 22 and SCP 24. The signaling between MSC 18 and HLR 22 may conform to IS-41 specifications. A recent revision of the IS-41 specifications, ANSI/TIA/EIA-41-D-97, published in December 1997, is incorporated herein by reference. The signaling between MSC 18 and SCP 24 may conform to the specification "Wireless Intelligent Network," TIA/EIA/IS-771, published in July 1999, which is incorporated herein by reference. Other signaling protocols could be used, however.

2. EXEMPLARY OPERATION

In an exemplary embodiment, the multiple directory numbers of mobile station 12 are all be assigned to the same call connection system connected to PSTN 20. For example, the directory numbers of mobile station 12 may all be assigned to MSC 18, which may serve as the "home" MSC of mobile station 12. As a result, calls to any of the directory numbers of mobile station 12 would be routed to MSC 18. Alternatively, different directory numbers of mobile station 12 may be assigned to different call connection systems.

Despite having multiple directory numbers, mobile station 12 could still have only a single mobile station identification (MSID) or mobile identification number (MIN). When mobile station 12 is called, mobile station 12 may be notified of which directory number or "personality" was called through the use of one or more identifier codes that are transmitted to the mobile station, e.g., in page or alert messages. An identifier code may, for example, consist of one or more digits, such as the digits of the called directory number, and/or other symbols. The identifier code may cause the mobile station to respond in a special manner. For example, each identifier code may cause mobile station 12 to generate a distinct user-discernible indication. The user-discernible indication could involve, for example, a distinctive ring tone, indicator light, a message or icon on the screen, and/or a distinctive screen color. From this user-discernible indication, the user may be able to determine what directory number or what "personality" is being called. In an exemplary embodiment, the user is able to select what user-discernible indication mobile station 12 will provide for each directory number or "personality."

Each identifier code may be associated with one or more of the directory numbers of mobile station 12. In this way, an identifier code may represent a specific directory number, or an identifier may represent multiple directory numbers, e.g., directory numbers that have the same "personality" or type, such as personal numbers. Moreover, not all of the directory numbers of mobile station 12 may be associated with an identifier code. For example, mobile station 12 may have a "primary" directory number that is not associated with an identifier code and one or more "secondary" directory numbers that are associated with one or more identifier codes. As a result, when mobile station 12 receives a call placed to the primary directory number, mobile station 12 may respond in a conventional manner, e.g., by ringing.

However, when mobile station 12 receives a call placed to a secondary directory number, mobile station 12 also receives the identifier code associated with the secondary directory number. As a result, mobile station 12 may respond in a special manner, e.g., by ringing and displaying a particular screen color.

Figure 2:
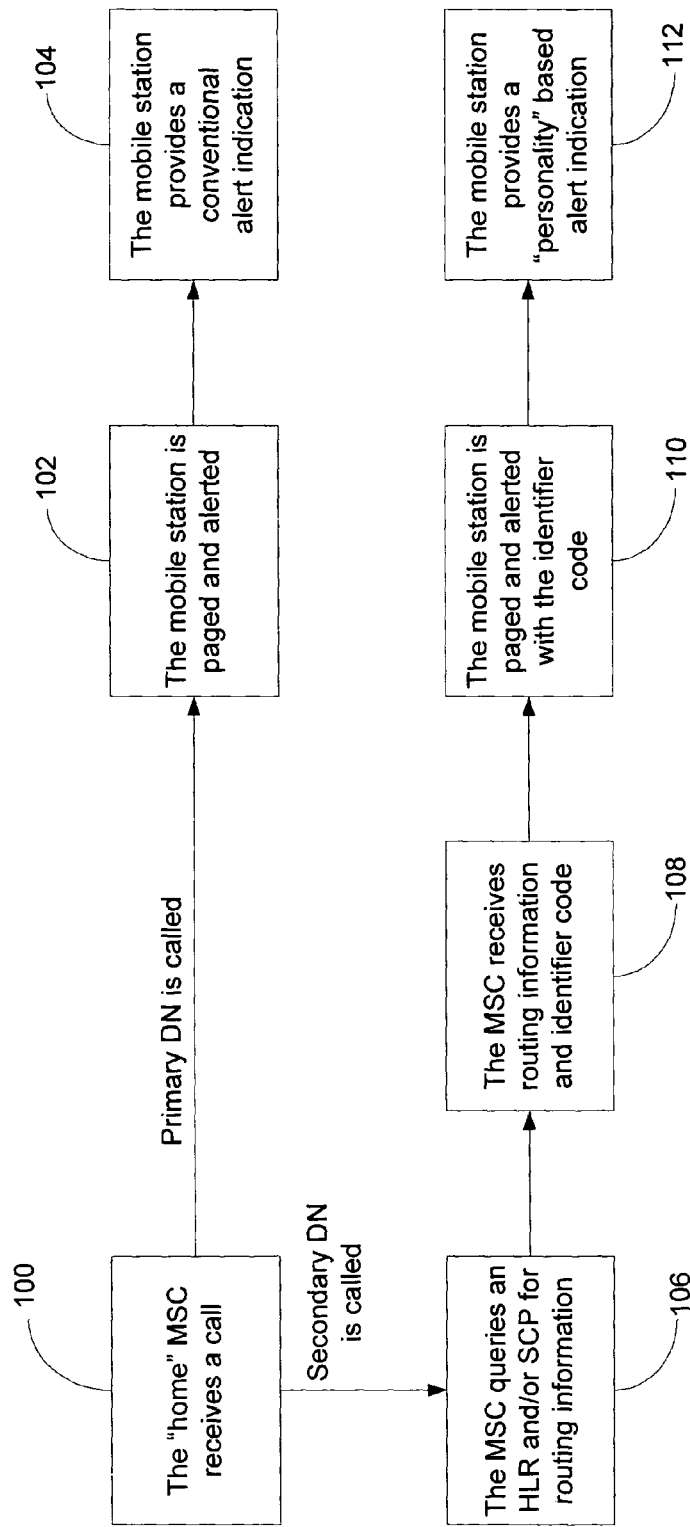
FIG. 2 is a flow chart illustrating a process of terminating a call to a mobile station, in accordance with an exemplary embodiment of the present invention.

FIG. 2 is a flow chart illustrating an exemplary method of terminating a call to mobile station 12 for the case when mobile station 12 has a primary directory number (primary DN) and a secondary directory number (secondary DN) assigned to MSC 18, and mobile station 12 is operating in an area served by MSC 18. The process may begin when MSC 18 receives a request to terminate a call to one of the directory numbers of mobile station 12, as indicated by block 100. The call may originate from a landline station, such as landline telephone 30, from a mobile station, or from some other source. What happens next may depend on whether the primary DN or the secondary DN is called. If the primary DN is called, then mobile station 12 may be paged and alerted in a conventional manner, as indicated by block 102. In response, mobile station 12 may provide a conventional alert indication, such as a ring tone or vibration, as indicated by block 104. Thus, the primary DN may correspond to and be treated as the conventional mobile directory number (MDN) of mobile station 12.

However, if the secondary DN is called, MSC 18 may query a call control system, such as HLR 22, SCP 24, and/or other call control system, for routing information, as indicated by block 106. The query may identify the secondary DN as the number being called. When the call control system receives the query, it retrieves the identifier code associated with the secondary DN, as well as one or more identifiers of mobile station 12 (e.g., MIN, MSID, or MDN) and provides this information to MSC 18. Thus, MSC 18 receives the identifier code and routing information that MSC 18 can use to reach mobile station 12 (e.g., the MIN, MSID, or MDN of mobile station 12), as indicated by block 108. Mobile station 12 is then paged and alerted with the identifier code, as indicated by block 110. More particularly, the identifier code may be included in a page message or an alert message (or both) transmitted to mobile station 12. In response to the identifier code, mobile station 12 provides a "personality" based alert indication, as indicated by block 112. The personality based alert indication is associated with the particular identifier code that mobile station 12 received. The personality based alert indication of block 112 may involve a user-discernible indication, such as an indicator light or a change in screen color, instead of or in addition to the conventional alert indication of block 104. In this way, the user may be able to determine something about the call, e.g., whether it is a work-related call or a personal call, and decide whether to answer the call or let the call go to voice mail.

Figure 3:
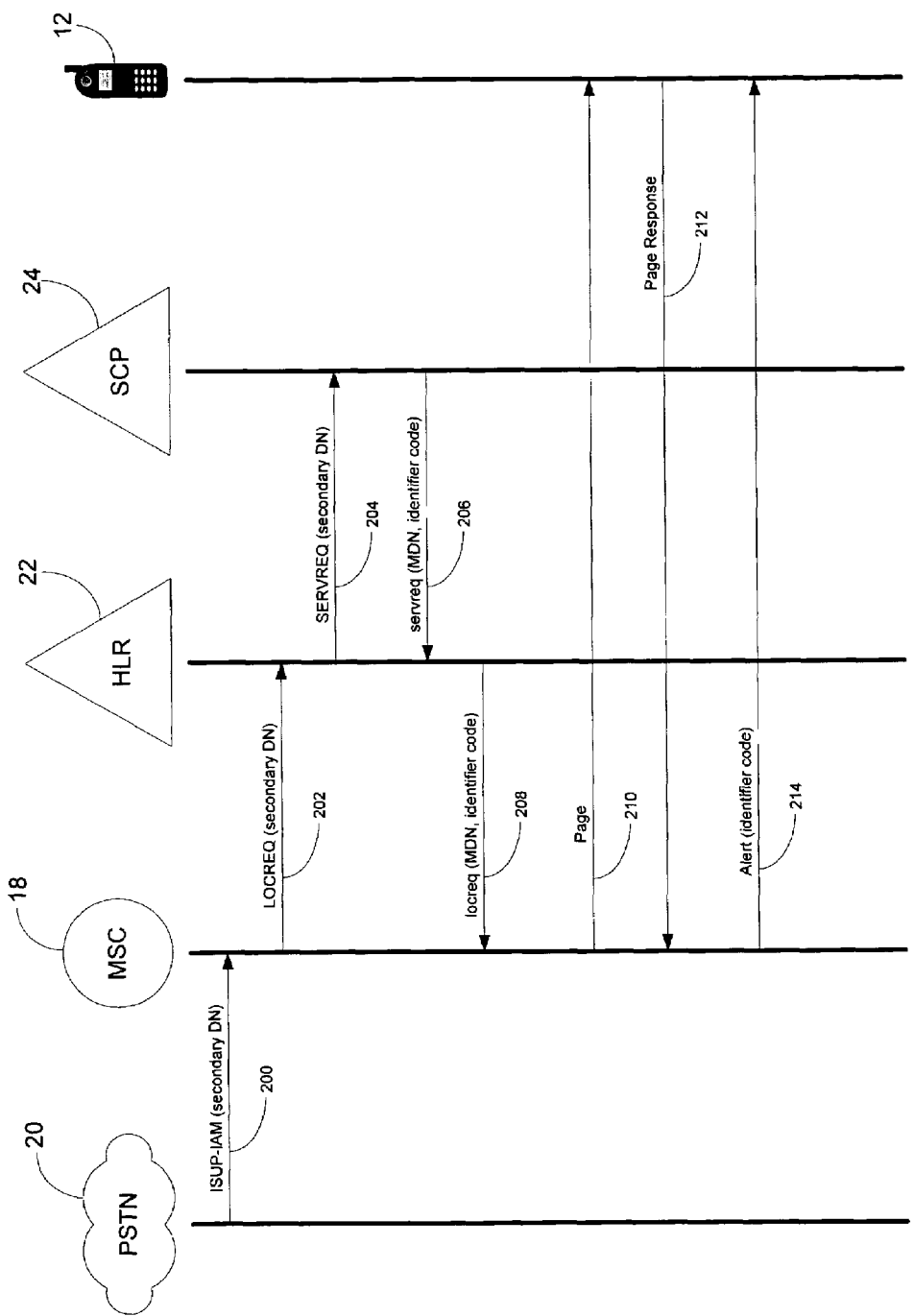
FIG. 3 is a simplified call-flow diagram illustrating exemplary signaling to terminate a call to a mobile station, in accordance with an exemplary embodiment of the present invention.

In an exemplary embodiment, the process shown in FIG. 2 of terminating a call to the secondary DN may be implemented as a type of incoming call screening service, i.e., a "personality" service, as illustrated in the simplified call-flow diagram of FIG. 3. Thus, at step 200, MSC 18 may receive a request to terminate a call to the secondary DN of mobile station 12, e.g., an SS7 ISUP-IAM message that identifies the secondary DN as the called number. To receive instructions on how to route the call to this secondary DN, MSC 18 sends HLR 22 an IS-41 Location Request (LOCREQ) message, at step 202. The LOCREQ of step 202 includes the secondary DN. HLR 22 determines that the user corresponding to the secondary DN subscribes to a personality service for which SCP 24 contains the service logic. As a result, HLR 22 sends SCP 24 an IS-41 Service Request (SERVREQ) message, at step 204. The SERVREQ message of step 204 includes the secondary DN and may also include a parameter that identifies the "personality" service that is being invoked. SCP 24 identifies the MDN and identifier code that correspond to the secondary DN and sends this information to HLR 22 in a servreq response message, at step 206. The MDN may correspond to the primary DN of mobile station 12, for example. Alternatively, instead of MDN, SCP 24 may use the MSCID of mobile station 12 or some other identifier that indicates the call should be routed to mobile station 12. HLR 22, in turn, forwards the MDN (or other identifier of mobile station 12) and identifier code to MSC 18 in a locreq response message, at step 208. With this information, MSC 18 is able to route the call to mobile station 12. Thus, MSC 18 sends a page message to mobile station 12, at step 210. Mobile station 12 receives the page message and sends a page response message, at step 212. MSC 18 then sends an alert message that includes the identifier code for the secondary DN, at step 214.

It is to be understood that the incoming call screening approach illustrated in FIG. 3 is exemplary only. The process of terminating a call to mobile station 12 when its secondary DN is called could be implemented in other ways. For example, MSC 18 may be provided with triggers such that when the secondary DN of mobile station 12 is called, MSC 18 queries SCP 24 directly. SCP 24 may then respond with the MDN of mobile station 12 and the identifier code that corresponds to the secondary DN. If mobile station 12 is operating in an area served by MSC 18, then MSC 18 may simply page and alert mobile station 12, using this identifier code. If, however, mobile station 12 is roaming, then MSC 18 may use the MDN to query the HLR 22, e.g., using an IS-41 Location Request, and thereby obtain a temporary location directory number (TLDN) to use in order to reach the system currently serving mobile station 12. MSC 18 may then forward the call to that serving system through PSTN 20, e.g., using SS7 signaling. In some cases, MSC 18 may also be able to forward the identifier code to the serving system, e.g., depending on the capabilities of the network elements involved in the SS7 signaling.

The user may also be able to select which directory number, e.g., the primary DN or the secondary DN, to use when originating a call from mobile station 12 to a called party. For example, the user may select a directory number that is familiar to the called party. In this way, the called party, using a caller identification service, such as calling line identification (CLID) or automatic number identification (ANI), may be able to recognize the call as originating from a familiar number, e.g., a personal number, rather than from an unfamiliar number, e.g., a work number.

Figure 4:
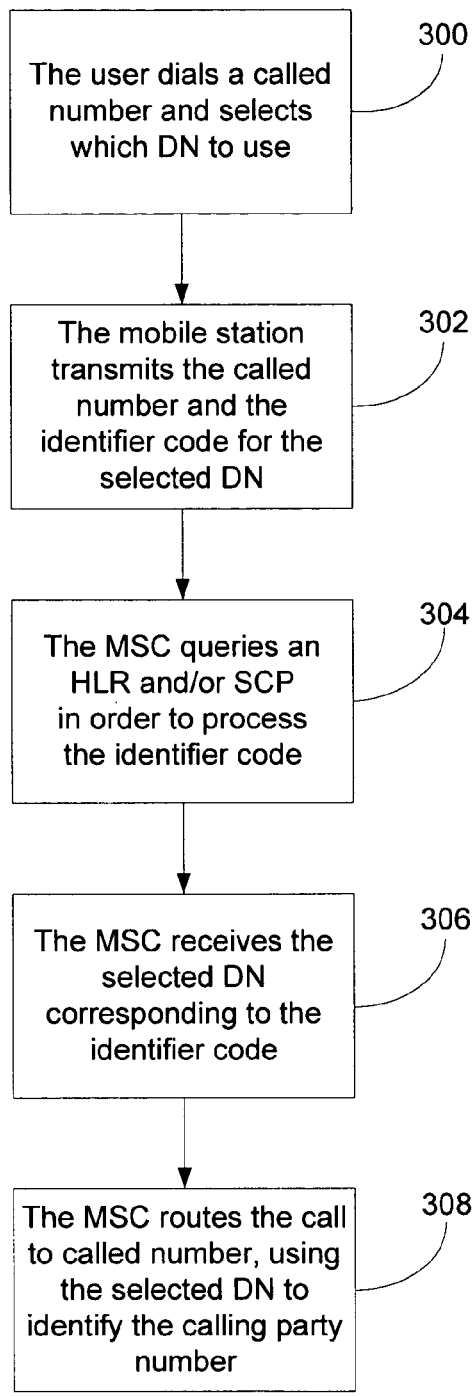
FIG. 4 is a flow chart illustrating a process of originating a call from a mobile station, in accordance with an exemplary embodiment of the present invention

FIG. 4 illustrates an exemplary process for originating a call from mobile station 12, using a selected one of its directory numbers. The process may begin when the user dials a called number and selects which DN mobile station 12 should use for the call, as indicated by block 300. In some cases, the user may have selected the DN in advance of placing the call to this called number. In other cases, the user may select the DN when dialing the digits to place the call. For example, when dialing the called number, the user may also dial a digit string, such as **N, to indicate that directory number N should be used to originate the call.

Mobile station 12 then transmits the called number and the identifier code for the selected DN, e.g., in an origination request message, as indicated by step 302. The identifier code associated with a directory number for call origination may be, but need not be, the same identifier code associated with the directory number for call termination. The identifier code may be transmitted in a special field in the origination request message, as a feature code inserted in the dialed digits string, or in some other manner.

When MSC 18 receives the identifier code, MSC 18 queries a call control system, such as HLR 22 and/or SCP 24, in order to process the identifier code, as indicated by block 304. For example, MSC 18 may send SCP 24 an IS-771 Analyzed Information request message that includes the identifier code and an identifier of mobile station 12. The call control system, e.g., SCP 24, identifies the selected DN corresponding to the identifier code and forwards this information to MSC 18. Thus, MSC 18 receives the selected DN corresponding to the identifier code, as indicated by block 306. MSC 18 then routes the call to the called number, using the selected DN to identify the calling party number, as indicated by block 308. For example, MSC 18 may send an SS7 ISUP-IAM message, with the selected DN as the calling party number, to route the call through PSTN 20. As a result, the called party, using a caller identification service, may observe the call as originating from the directory number selected by the user of mobile station 12.

3. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of managing a plurality of directory numbers for a mobile station, said plurality of directory numbers including at least a first directory number and a second directory number, said method comprising: associating said first directory number with an identifier code recognized by said mobile station; detecting a first incoming call request to connect a first incoming call to said first directory number; in response to said first incoming call request, transmitting a query to a call control system, said query identifying said first directory number; receiving a response to said query, said response including said identifier code; transmitting over an air interface a first message to said mobile station, said first message including said identifier code to indicate that said first directory number is being called; detecting a second incoming call request to connect a second incoming call to said second directory number; and in response to said second incoming call request, transmitting a second message to said mobile station without including said identifier code.

2. The method of claim 1, wherein said response further includes an identification of said mobile station.

3. The method of claim 2, further comprising:
said call control system determining said identifier code and said identification of said mobile station based on said first directory number.

4. The method of claim 1, further comprising:
said mobile station providing a user-discernible indication based on said identifier code.

5. The method of claim 1, wherein said call control system includes a service control point (SCP).

6. The method of claim 1, wherein said call control system includes a home location register (HLR).

7. The method of claim 1, wherein said first message is an alert message.

8. The method of claim 1, further comprising:
detecting a second incoming call request to connect a second incoming call to said second directory number; and
in response to said second incoming call request, transmitting a second message to said mobile station without including said identifier code.

* * * * *